(12) United States Patent
Konno et al.

(10) Patent No.: US 11,750,975 B2
(45) Date of Patent: Sep. 5, 2023

(54) SIGNAL PROCESSING DEVICE, SIGNAL PROCESSING METHOD, AND RECORDING MEDIUM

(71) Applicant: Panasonic Intellectual Property Management Co., Ltd., Osaka (JP)

(72) Inventors: Fumiyasu Konno, Osaka (JP); Masahide Onishi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/691,671

(22) Filed: Mar. 10, 2022

(65) Prior Publication Data

US 2022/0303678 A1 Sep. 22, 2022

(30) Foreign Application Priority Data

Mar. 16, 2021 (JP) .................................. 2021-042433

(51) Int. Cl.
*H04R 3/04* (2006.01)
*G06F 7/50* (2006.01)

(52) U.S. Cl.
CPC ........ *H04R 3/04* (2013.01); *G06F 7/50* (2013.01)

(58) Field of Classification Search
None
See application file for complete search history.

(56) References Cited

U.S. PATENT DOCUMENTS 7,079,659 B1    7/2006   Oohashi et al.

FOREIGN PATENT DOCUMENTS

| EP | 0795860 B1 | * | 6/1997 |
| JP | 09-313610 |   | 12/1997 |
| JP | 2020167682 A | * | 10/2020 |

OTHER PUBLICATIONS

English machine translation of JP2020167682A (Year: 2020).*

* cited by examiner

*Primary Examiner* — James K Mooney
(74) *Attorney, Agent, or Firm* — Greenblum & Bernstein, P.L.C.

(57) ABSTRACT

A signal processing device includes: an obtainer that obtains sound data; a pitch controller that controls pitch of the sound data obtained to increase the pitch by a factor of n (a real number greater than 1); an extractor that extracts frequency components of at least 20 kHz which are included in the sound data whose pitch is controlled; an adder that adds the frequency components extracted to the sound data obtained; and an outputter that outputs sound data to which the frequency components extracted are added.

8 Claims, 4 Drawing Sheets

SIGNAL PROCESSING DEVICE, SIGNAL PROCESSING METHOD, AND RECORDING MEDIUM

CROSS REFERENCE TO RELATED APPLICATION

The present application is based on and claims priority of Japanese Patent Application No. 2021-42433 filed on Mar. 16, 2021.

FIELD

The present disclosure relates to a signal processing device, a signal processing method, and a recording medium.

BACKGROUND

It is known that emission of inaudible-range sounds that include frequency components of at least 20 kHz to a person improves cerebral blood flow and achieves an effect of improving mental and physical states, for example. Such an effect is called the hypersonic effect. For example, Patent Literature (PTL) 1 discloses a sound generator that generates sounds that can achieve such effects.

CITATION LIST

Patent Literature

PTL 1: Japanese Unexamined Patent Application Publication No. H9-313610

SUMMARY

However, the sound generator according to the above-described PTL 1 can be improved upon.

In view of this, the present disclosure provides a signal processing device and the like which are capable of improving upon the above related art.

A signal processing device according to an aspect of the present disclosure includes: an obtainer that obtains sound data; a pitch controller that controls pitch of the sound data obtained to increase the pitch by a factor of n, where n is a real number greater than 1; an extractor that extracts frequency components of at least 20 kHz which are included in the sound data whose pitch is controlled; an adder that adds the frequency components extracted to the sound data obtained; and an outputter that outputs sound data to which the frequency components extracted are added.

A signal processing device according to one aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENTS

Embodiment

Technology of the sound generator disclosed in the above-described PTL 1 requires sound data including frequency components of at least 20 kHz, such as musical instrument sounds of gamelan, to be prepared in advance.

Accordingly, the following describes a signal processing device and the like which can generate sound data including frequency components of at least 20 kHz.

Hereinafter, a signal processing device according to an embodiment will be described with reference to the drawings.

Figure 1:
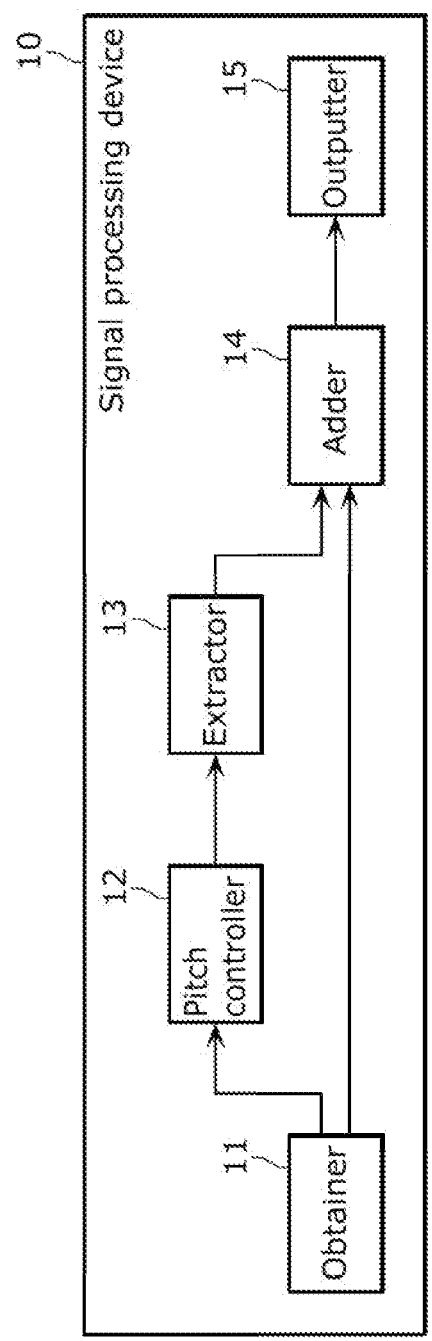
FIG. 1 is a diagram illustrating a configuration of one example of a signal processing device according to an embodiment.

FIG. 1 is a diagram illustrating a configuration of one example of signal processing device 10 according to the embodiment.

Signal processing device 10 is a device for generating sound data including frequency components of at least 20 kHz from obtained sound data. Emission of sounds including frequency components of at least 20 kHz to a person is known to achieve the hypersonic effect by which mental and physical states improve. Signal processing device 10 is a device for generating sound data for achieving the hypersonic effect. Signal processing device 10 includes obtainer 11, pitch controller 12, extractor 13, adder 14, and outputter 15. Signal processing device 10 includes a processor, memory, etc. The memory is read-only memory (ROM), random access memory (RAM), etc., and can store programs to be executed by the processor. Obtainer 11, pitch controller 12, extractor 13, adder 14, and outputter 15 are realized by, for example, the processor that executes programs stored in the memory.

Obtainer 11 obtains sound data. The sound data may be sound data not including frequency components of at least 20 kHz. For example, the sound data may be music data or environmental sound data. For example, the sound data may be obtained from a music source such as a compact disc (CD). Sound data recorded on a CD is data having a sampling frequency of 44.1 kHz, 16 bits, and two channels. Details will be described later, but adder 14 adds frequency components of at least 20 kHz to sound data obtained by obtainer 11. However, when a sampling frequency is 44.1 kHz, frequency components of up to the half of the foregoing frequency that is 22.05 kHz can only be added. For this reason, when sound data is obtained from a CD, obtainer 11 performs upsampling on the obtained sound data. With this, sound data (e.g., high-resolution sound source) having a sampling frequency of 192 kHz, 24 to 32 bits, and two channels can be generated, for example. Accordingly, frequency components of up to 96 kHz can be added to the sound data. Note that obtainer 11 may directly obtain a high-resolution sound source as sound data. In this case, obtainer 11 need not perform upsampling.

Pitch controller 12 controls the pitch (how high or low a sound is) of sound data obtained by obtainer 11 to increase the pitch by a factor of n (n is a real number greater than 1). By increasing the pitch of the sound data by a factor of n, frequency components of the sound data as a whole transition n times further to a high frequency side. The value of n is not particularly limited; however, the value is set such that frequency components of at least 20 kHz are included in sound data whose pitch is controlled. For example, pitch controller 12 obtains the maximum frequency component included in sound data. When the maximum frequency component is less than 20 kHz, pitch controller 12 may set, as the value of n, a value that is more than or equal to a value obtained by dividing 20 kHz by the maximum frequency component. For example, n may be $m^{th}$ (m is an integer of 1 or greater) power of 2. In other words, pitch controller 12 may control the pitch of obtained sound data to increase the pitch by a factor of $m^{th}$ power of 2 (a twofold increase, a fourfold increase, an eightfold increase, and so on). Moreover, a degree of an effect of improvement in mental and physical states which can be obtained may vary according to the value of m. In view of this, signal processing device 10 may include an inputter that receives information indicating the degree of an effect of improvement in mental and physical states which a user wishes to obtain, and pitch controller 12 may control the value of m according to the information received by the inputter. With this, a user can obtain the degree of an effect of improvement which the user wishes to obtain.

Note that pitch controller 12 may control a sound pressure level in addition to the pitch. In this case, pitch controller 12 may increase or decrease the sound pressure level.

Extractor 13 extracts frequency components of at least 20 kHz which are included in sound data whose pitch is controlled. Extractor 13 is, for example, a high-pass filter. Extractor 13 is realized by, for example, a digital filter, but may be realized by an analog filter. Extractor 13 may extract, as frequency components of at least 20 kHz which are included in sound data whose pitch is controlled, frequency components of at least 40 kHz, for example.

Note that extractor 13 may extract frequency components of at least a particular frequency (e.g., 4 kHz) which are included in obtained sound data in the first place. Then, pitch controller 12 may increase the extracted frequency components by a factor of n (e.g., a tenfold increase). Frequency components of at least 20 kHz can be obtained in this way also.

Adder 14 adds frequency components extracted by extractor 13 to sound data obtained by obtainer 11. With this, sound data including frequency components of at least 20 kHz can be generated.

Outputter 15 outputs sound data to which frequency components extracted by extractor 13 are added by adder 14. For example, outputter 15 outputs the sound data to a loudspeaker and the like. With this, a user can listen to sounds (e.g., music or environmental sound) indicated by the sound data, and can concurrently obtain the hypersonic effect.

Next, a specific example of sound data including frequency components of at least 20 kHz will be described with reference to FIG. 2 through FIG. 4.

Figure 2:
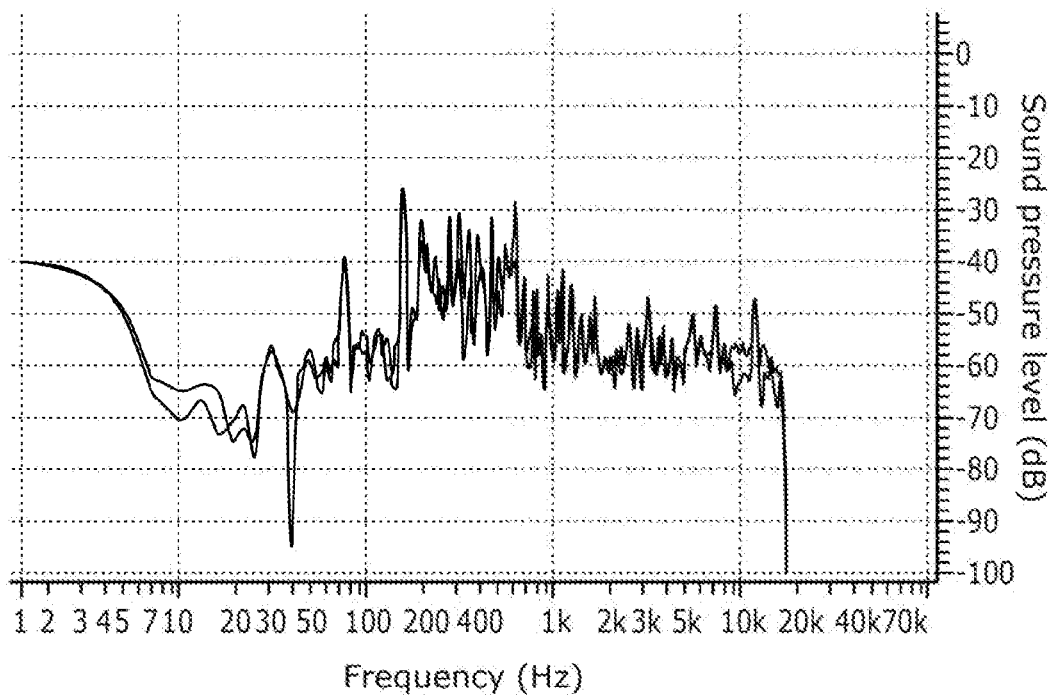
FIG. 2 is a graph showing one example of frequency characteristics of obtained sound data.

FIG. 2 is a graph showing one example of frequency characteristics of obtained sound data.

Figure 3:
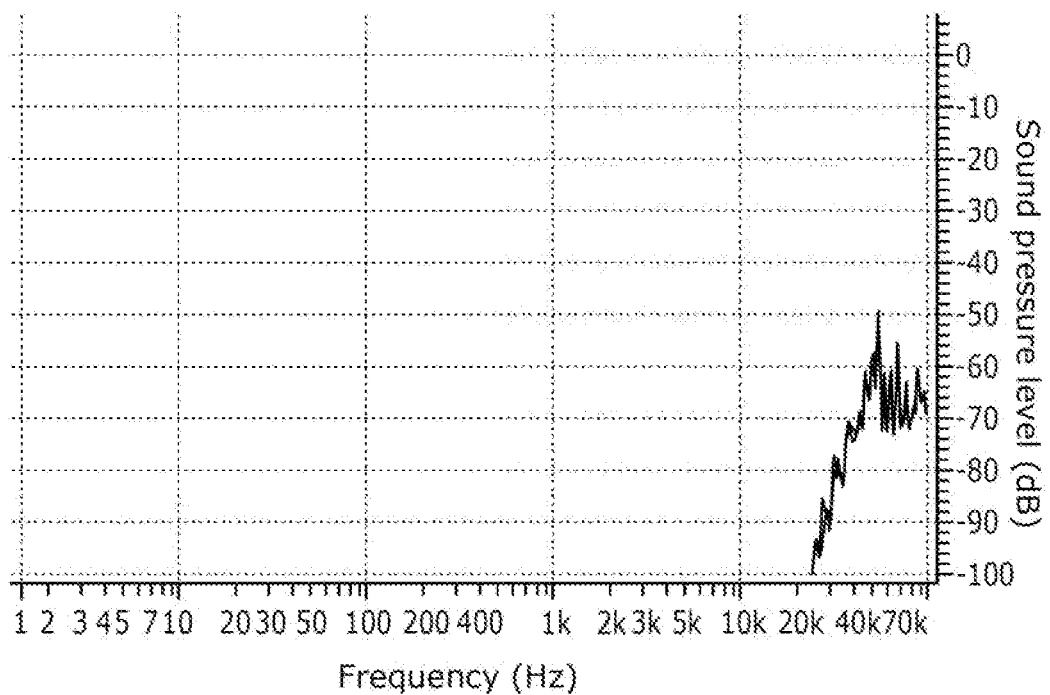
FIG. 3 is a graph showing one example of frequency characteristics of extracted frequency components of at least 20 kHz.

FIG. 3 is a graph showing one example of frequency characteristics of extracted frequency components of at least 20 kHz.

Figure 4:
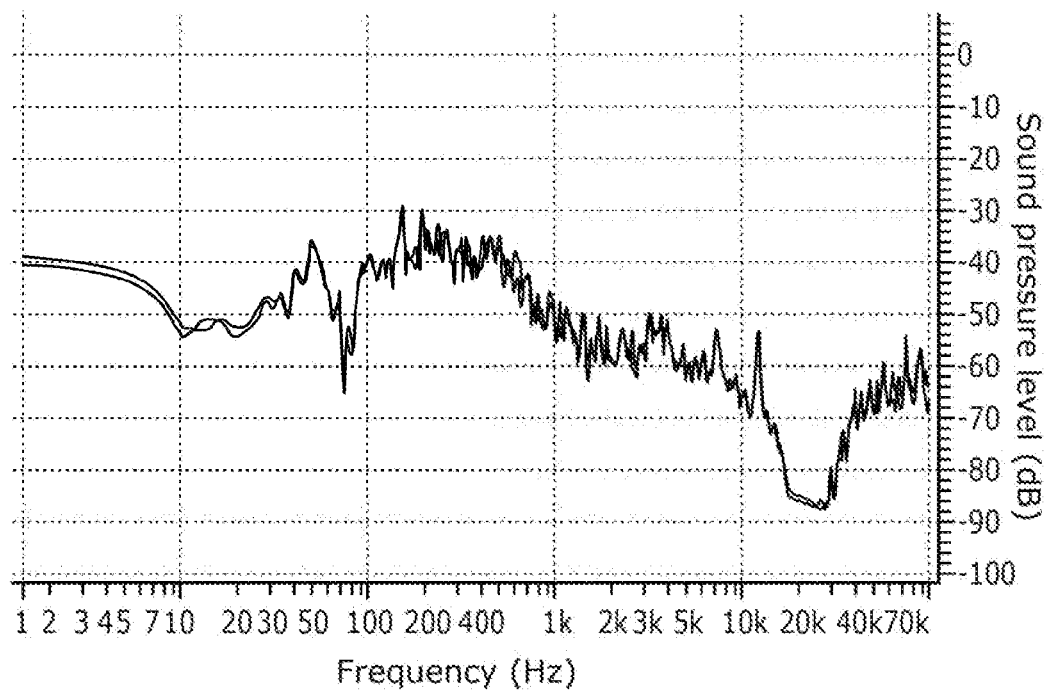
FIG. 4 is a graph showing one example of frequency characteristics of sound data to which the extracted frequency components of at least 20 kHz are added.

FIG. 4 is a graph showing one example of frequency characteristics of sound data to which the extracted frequency components of at least 20 kHz are added.

For example, let us assume that obtainer 11 obtains sound data as illustrated in FIG. 2. The obtained sound data is, for example, sound data having sampling frequency of 192 kHz, 32 bits, and two channels. As illustrated in FIG. 2, it is apparent that the obtained sound data does not include frequency components of at least 20 kHz.

Next, pitch controller 12 controls the pitch of the obtained sound data to increase the pitch by a factor of 10, and extractor 13 extracts frequency components of at least 20 kHz which are included in the sound data whose pitch is controlled to be increased by a factor of 10. With this, frequency components as illustrated in FIG. 3 are extracted.

Thereafter, adder 14 adds, to the obtained sound data (sound data illustrated in FIG. 2), the extracted frequency components (frequency components illustrated in FIG. 3). With this, sound data as illustrated in FIG. 4 can be generated. As illustrated in FIG. 4, it is apparent that sound data that includes frequency components of at least 20 kHz is generated.

As has been described above, sound data including frequency components of at least 20 kHz can be generated from sound data not including frequency components of at least 20 kHz.

[Conclusion]

Signal processing device 10 includes: obtainer 11 that obtains sound data; pitch controller 12 that controls pitch of the sound data obtained to increase the pitch by a factor of n (a real number greater than 1); extractor 13 that extracts frequency components of at least 20 kHz which are included in the sound data whose pitch is controlled; adder 14 that adds the frequency components extracted to the sound data obtained; and outputter 15 that outputs sound data to which the frequency components extracted are added.

With this, although obtained sound data does not include frequency components of at least 20 kHz, frequency components of at least 20 kHz can be generated by increasing the pitch by a factor of n. However, if the sound data whose pitch is controlled is output as is, audible-range sounds may be unpleasant. In view of this, frequency components of at least 20 kHz are extracted from the sound data whose pitch is controlled, and the frequency components of at least 20 kHz are added to the obtained original sound data. With this, sound data including the frequency components of at least 20 kHz can be generated, while maintaining audible-range sounds as they are such that the sounds remain unchanged from the original sound data (in other words, while preventing the reduction in quality of the audible-range sounds).

Pitch controller 12 may control the sound data obtained to increase the pitch by a factor of $m^{th}$ (m is an integer of 1 or greater) power of 2.

Although frequency components of at least 20 kHz are inaudible-range sounds, a difference between the tonality of inaudible-range sounds and the tonality of audible-range sounds may give a person to whom the sounds including frequency components of at least 20 kHz are emitted a feeling of strangeness. In view of this, the pitch of the obtained sound data is controlled to be increased by a factor of $m^{th}$ power of 2, so that sound data including frequency components of at least 20 kHz whose tonality is the same as the tonality of audible-range sounds can be generated.

Extractor 13 may extract frequency components of at least 40 kHz which are included in the sound data whose pitch is controlled.

It has been also alleged that frequency components of from 20 kHz to 40 kHz are unlikely to achieve the hypersonic effect. In view of this, frequency components of at least 40 kHz which are included in sound data whose pitch is controlled are extracted, so that sound data including the frequency components of at least 40 kHz which readily achieve the hypersonic effect can be generated.

Other Embodiments

Hereinbefore, embodiments have been described as exemplifications of techniques according to the present disclosure. However, the techniques according to the present disclosure are not limited to these embodiments; the techniques are applicable to embodiments to which changes, replacements, additions, omissions, etc. are made as appropriate. For example, the following variations are included in one embodiment of the present disclosure.

For example, the present disclosure is not only realized as signal processing device 10, but also as a signal processing method including steps (processes) performed by respective structural elements included in signal processing device 10.

Figure 5:
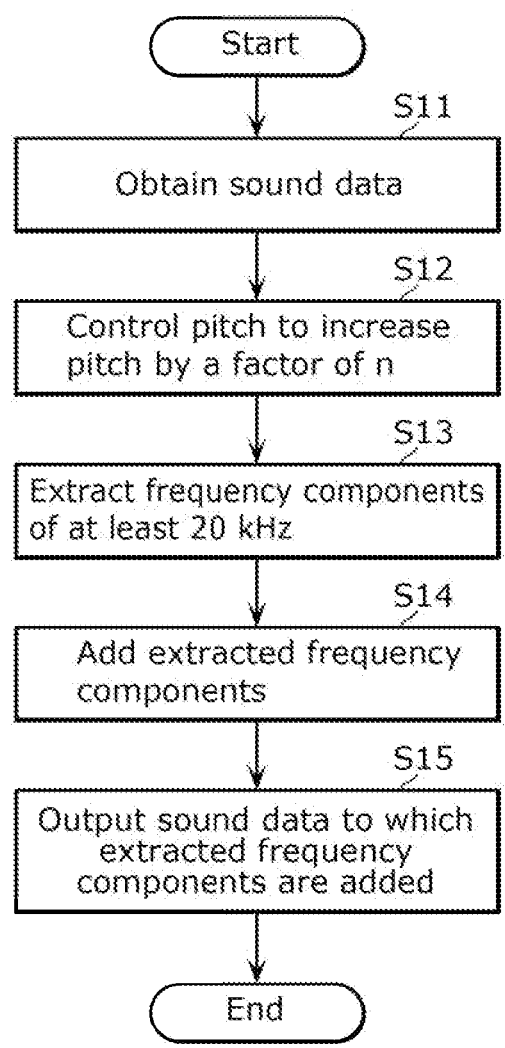
FIG. 5 is a flowchart illustrating one example of a signal processing method according to the other embodiments.

FIG. 5 is a flowchart illustrating one example of a signal processing method according to the other embodiments.

A signal processing method, as illustrated in FIG. 5, includes: obtaining sound data (step S11); controlling pitch of the sound data obtained to increase the pitch by a factor of n (a real number greater than 1) (step S12); extracting frequency components of at least 20 kHz which are included in the sound data whose pitch is controlled (step S13); adding the frequency components extracted to the sound data obtained (step S14); and outputting sound data to which the frequency components extracted are added (step S15).

For example, the steps in the signal processing method may be performed by a computer (computer system). Moreover, the present disclosure can be realized as a program for causing the computer to execute the steps included in the signal processing method.

Furthermore, the present disclosure can be realized as a non-transitory computer-readable recording medium, such as a CD-ROM, on which the program is recorded.

For example, when the present disclosure is realized by a program (software), each of the steps is performed by executing a program using hardware resources, such as a central processing unit (CPU), memory, and an input/output circuit. Specifically, each step is performed by the CPU performing arithmetic operation by obtaining data from, for example, the memory or the input/output circuit, and outputting results of the arithmetic operation to, for example, the memory or the input/output circuit.

In addition, each structural element included in signal processing device 10 according to the above-described embodiments may be realized as a dedicated circuit or a general-purpose circuit.

Moreover, each structural element included in signal processing device 10 according to the above-described embodiments may be realized as a large scale integration (LSI) circuit that is an integrated circuit (IC).

The IC is not limited to the LSI circuit; the IC may be realized by a dedicated circuit or a general-purpose processor. A field programmable gate array (FPGA) that is programmable, or a reconfigurable processor whose connections and settings of a circuit cell in the LSI circuit are configurable may be used.

Furthermore, when circuit integration technology that replaces the LSI circuit by employing other technologies developed through the advance of semiconductor technologies or derived from semiconductor technologies is introduced, circuit integration of each structural element included in signal processing device 10 may be achieved by employing the technology as a matter of course.

The present disclosure also encompasses: embodiments achieved by applying various modifications conceivable to those skilled in the art to each embodiment; and embodiments achieved by optionally combining the structural elements and the functions of each embodiment without departing from the essence of the present disclosure.

While various embodiments have been described herein above, it is to be appreciated that various changes in form and detail may be made without departing from the spirit and scope of the present disclosure as presently or hereafter claimed.

Further Information about Technical Background to this Application

The disclosure of the following patent application including specification, drawings and claims is incorporated herein by reference in its entirety: Japanese Patent Application No. 2021-42433 filed on Mar. 16, 2021.

INDUSTRIAL APPLICABILITY

The present disclosure is applicable to, for example, sound-reproducing systems that reproduce sounds.

The invention claimed is:

1. A signal processing device, comprising:
an obtainer that obtains sound data;
a pitch controller that increases a pitch of the sound data as a whole by a factor of n, where n is a real number greater than 1;
an extractor that extracts frequency components of at least 20 kHz which are included in the sound data whose pitch is increased;
an adder that adds only the frequency components of at least 20 kHz which are extracted by the extractor to the sound data obtained by the obtainer; and
an outputter that outputs the sound data to which the frequency components of at least 20 kHz are added.

2. The signal processing device according to claim 1, wherein
the pitch controller increases the pitch by a factor of an $m^{th}$ power of 2, where m is an integer of 1 or greater.

3. The signal processing device according to claim 1, wherein
the extractor extracts frequency components of at least 40 kHz which are included in the sound data whose pitch is increased.

4. A signal processing method, comprising:
obtaining sound data,
increasing a pitch of the sound data as a whole by a factor of n, where n is a real number greater than 1;
extracting frequency components of at least 20 kHz which are included in the sound data whose pitch is increased;
adding only the frequency components of at least 20 kHz which are extracted in the extracting to the sound data; and
outputting the sound data to which the frequency components of at least 20 kHz are added in the adding.

5. A non-transitory computer-readable recording medium for use in a computer, the non-transitory computer-readable recording medium having a computer program recorded thereon for causing the computer to execute the signal processing method according to claim 4.

6. A signal processing device, comprising:
a processor; and
a memory that stores a program that, when executed by the processor, causes the processor to:
obtain sound data;

increase a pitch of the sound data as a whole by a factor of n, where n is a real number greater than 1;
extract frequency components of at least 20 kHz which are included in the sound data whose pitch is increased;
add only the extracted frequency components of at least 20 kHz to the obtained sound data; and
output the sound data to which the frequency components of at least 20 kHz are added.

7. The signal processing device according to claim 6, wherein
the processor increases the pitch by a factor of an $m^{th}$ power of 2, where m is an integer of 1 or greater.

8. The signal processing device according to claim 6, wherein
the processor extracts frequency components of at least 40 kHz which are included in the sound data whose pitch is increased.

\* \* \* \* \*